United States Patent [19]

Engler et al.

[11] Patent Number: 5,086,806

[45] Date of Patent: Feb. 11, 1992

[54] AUTOMATIC FLOW CONTROL SYSTEM AND FLOOD PROTECTOR

[75] Inventors: Christopher J. Engler, Portland; Michael W. Johnson, St. Helens, both of Oreg.

[73] Assignee: Boyd Coffee Company, Portland, Oreg.

[21] Appl. No.: 680,838

[22] Filed: Apr. 5, 1991

[51] Int. Cl.$^5$ ............................................. F16K 17/00
[52] U.S. Cl. ............................. 137/486; 137/487.5; 137/624.12; 137/495
[58] Field of Search ............... 137/624.11, 624.12, 137/486, 487.5, 460, 495; 222/14, 16

[56] References Cited

U.S. PATENT DOCUMENTS

| | | | |
|---|---|---|---|
| 2,759,633 | 8/1956 | Ross | 222/16 |
| 4,200,203 | 4/1980 | Rider | 222/14 |
| 4,437,336 | 3/1984 | Abe . | |
| 4,468,406 | 8/1984 | d'Alayer de Costemore d'Are . | |
| 4,705,060 | 11/1987 | Goulbourne . | |
| 4,735,231 | 4/1988 | Jacquet | 137/486 X |
| 4,736,763 | 4/1988 | Britton et al. . | |
| 4,881,948 | 11/1989 | Nakane | 137/460 X |
| 4,911,200 | 3/1990 | Ben-Arie | 137/486 |
| 4,926,901 | 5/1990 | Waltenburg | 137/624.12 X |

*Primary Examiner*—Alan Cohan
*Attorney, Agent, or Firm*—Kolisch, Hartwell, Dickinson, McCormack & Heuser

[57] ABSTRACT

An automatic fluid-flow control system is provided for controlling the quantity of fluid allowed to flow uninterrupted through a conduit. It is particularly useful in controlling potentially damaging floods caused by breakage in a branch plumbing line used to supply water to beverage dispensing appliances, ice-making machines and similar devices which repeatedly consume limited quantities of water in relatively short flow cycles. The fluid-flow control system includes a flow meter which emits a signal containing information about the flow of fluid and also indicating when fluid is flowing and when it is not. The preferred metering device emits pulses at a rate proportional to the flow rate. A counter accumulates a pulse count during each period of fluid flow. A separate pulse sensing network senses the beginning and end of each period of fluid flow and disables and initializes the counter whenever fluid is not flowing. The accumulated pulse count in the counter is proportional to the quantity of fluid passing through the meter. The counter is set to close a solenoid valve whenever a predetermined maximum pulse count is exceeded. A back-up protective circuit is also provided, employing a timer to measure the time interval of each fluid-flow cycle. When the time interval is exceeded, the timer closes the solenoid valve. In addition to the flood protector mode of operation, a configuration employing the same circuit as a dispenser control device is also disclosed.

18 Claims, 2 Drawing Sheets

AUTOMATIC FLOW CONTROL SYSTEM AND FLOOD PROTECTOR

BACKGROUND AND SUMMARY OF THE INVENTION

The present invention relates generally to an apparatus for automatically shutting off fluid flow in a fluid conduit under predetermined conditions and more specifically to an improved flow control device for stopping fluid flow through a conduit when either a predetermined flow quantity or a predetermined time interval is exceeded.

Many types of automatic beverage dispensing devices, particularly those in commercial establishments or workplace employee kitchens, are supplied with water by a permanent branch plumbing line which interconnects the dispensing device with a local or municipal pressurized water supply system. A single branch plumbing line may supply water to one or more dispensing devices, including such appliances as coffee brewers, drink dispensers and ice makers, which are often located in close proximity to one another. Costly damage can occur in buildings if a malfunction in a dispensing device, or a break in the branch water line supplying the device, occurs at a time when the building or kitchen area is unattended or unoccupied. In particular, a malfunction or break which results in the free flow of water from a branch plumbing line will produce serious damage in a multi-story building, if allowed to run for many hours or over a weekend.

Various kinds of flood protection systems have been developed to deal with the threat of floods caused by leaking pipes. Such prior art systems include systems which incorporate specialized circuitry to detect pressure drops caused by a burst pipe, as in U.S. Pat. No. 4,735,231; timers which shut off a valve under certain conditions in the event of a long leak, also shown in U.S. Pat. No. 4,735,231; or sensors positioned at low points in the building or plumbing system to detect the presence of leakage water, as in U.S. Pat. No. 4,705,060. One disadvantage of prior art flood protection systems is that most systems are activated to shut off the flow in the branch plumbing line based on the time that flow continues, or on more complicated time-and-pressure or time-and-flow rate conditions. An example of the latter is found in U.S. Pat. No. 4,881,948. However, time of flow is not the most relevant factor in determining whether a continuous flow of fluid through a conduit is in fact creating a damaging or potentially damaging flood. If, for example, a branch water line supplying a beverage dispenser experiences reduced water pressure, the dispensing device may require additional time to fill a dispensing reservoir. Should that time exceed the pre-set maximum allowable time interval for a time-based flood protector, the protector will automatically shut off the plumbing line when no flood or leakage condition actually exists. Systems which detect the presence of leakage water at low points to determine if a flood is occurring, such as in U.S. Pat. No. 4,705,060, have the obvious disadvantage of being difficult to install due to multiple sensors at separate locations and the fact that considerable damage may already have occurred by the time the flood is detected.

Although prior art flood protection devices, such as those described above, do function to help control leaks which continue for an excessive time period or which produce sufficient flooding to trigger remote sensors, a better approach would be to incorporate a flood protector on a branch plumbing line which measures the actual flow quantity of fluid flowing in the line and which shuts off the line when an excessive flow quantity is detected.

Automatic fluid-flow control devices are also used for other purposes. Various kinds of dispensers employ automatic flow controllers to produce a brief, measured flow of fluid during a single dispensing cycle. An example of a beverage dispenser which employs such a flow controller is an automatic coffee brewer. In most coffee brewers, a tank with heating elements heats the water to the proper brewing temperature. Fresh water is admitted to the tank, usually by a solenoid valve which is controlled by a timer, each time the tank is refilled. Most flow controllers in such applications open the valve for a predetermined time interval and then reclose it, completing a single dispensing cycle. The disadvantage of using a flow controller which cuts off the flow after a predetermined time interval is that the actual quantity of water admitted to the tank can vary as the water pressure changes. It would be preferable to have a fluid-flow controller for controlling flow in a fluid conduit which admits only a predetermined quantity of fluid through the conduit during one dispensing cycle, rather than opening the conduit for a predetermined time interval.

An improved automatic fluid-flow control system would offer protection against excessive fluid flow, such as during a leak condition, but would not prematurely cut-off fluid-consuming devices before a flood actually develops. It would be particularly advantageous to have an automatic fluid-flow control system which permits only a predetermined quantity of fluid to pass through a branch conduit. It would also be advantageous to have an automatic fluid-flow control system which includes a back-up, redundant, protective shut-off which can engage the protective function even if the primary, flow quantity-based, shut-off fails. It would also be advantageous to have an improved automatic fluid-flow control system which can, using the same circuitry, perform either a flood protection function on a branch pluming line or serve as a automatic flow controller for use in a beverage dispenser or the like, allowing for economies of scale in manufacturing the flow controller to reduce the cost of both types of automatic flow controllers.

Accordingly, a fluid-flow control system is provided for shutting off the flow in a conduit under selected conditions by means of a signal-controlled valve. The system, in operative condition, comprises a flow monitor operatively connected to such a conduit for providing a first signal containing information about the volume of fluid flow in the conduit. The system also includes signal analyzing circuitry operatively connected to the flow monitor and the valve for analyzing the first signal to distinguish periods of substantial fluid flow from periods of no-flow in the conduit. The signal analyzing circuitry also measures the approximate quantity of fluid passing through the conduit during each period of substantial fluid flow. And the signal analyzing circuitry also closes the valve when a predetermined quantity of fluid passing through the conduit is exceeded.

In its preferred form, the signal analyzing circuitry of the fluid-flow control system includes a signal detector to establish the start and end of each period of fluid flow in the conduit. The signal detector outputs a reset signal to initialize the flow quantity measuring device during each period of no-flow. As such, the flow quantity measuring device is ready to begin accumulating a quantity measurement at the start of each period of substantial fluid flow. A secondary, back-up shut-off circuit is also preferably included in the control system to measure the time interval during each period of interrupted fluid-flow. The timer closes the valve when a predetermined interval is exceeded. The predetermined time interval is selected to exceed the longest anticipated interval required for the predetermined flow quantity to pass through the conduit. As such, the timer will only operate to close the valve when a malfunction has occurred in the primary protective circuitry.

DETAILED DESCRIPTION OF THE PREFERRED EMBODIMENT

Figure 1:
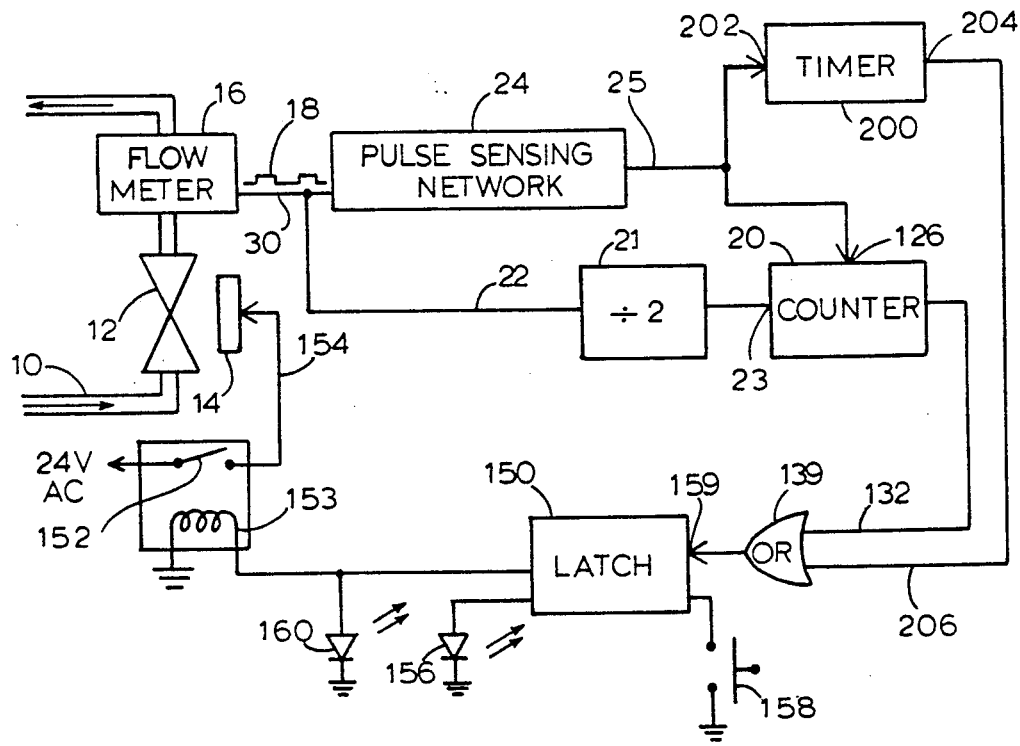
FIG. 1 is a schematic circuit diagram of a fluid-flow control system in accordance with the present invention.

FIG. 1 is a schematic block diagram showing the preferred embodiment of the automatic fluid-flow control system of the present invention. The system is designed to control the flow of fluid in a conduit 10, such as a pipe or plumbing line. A signal-controlled valve 12 controls the flow of fluid in conduit 10. Valve 12 is a conventional solenoid-actuated valve of the type known as a continuous-duty valve, which remains open as long as power is supplied to energize the solenoid 14, and which recloses whenever the power to the solenoid is interrupted. Solenoid 14 is designed for continuous energization over any desired time interval. Thus, valve 12 is controlled by the signal applied to solenoid 14.

Figure 2:
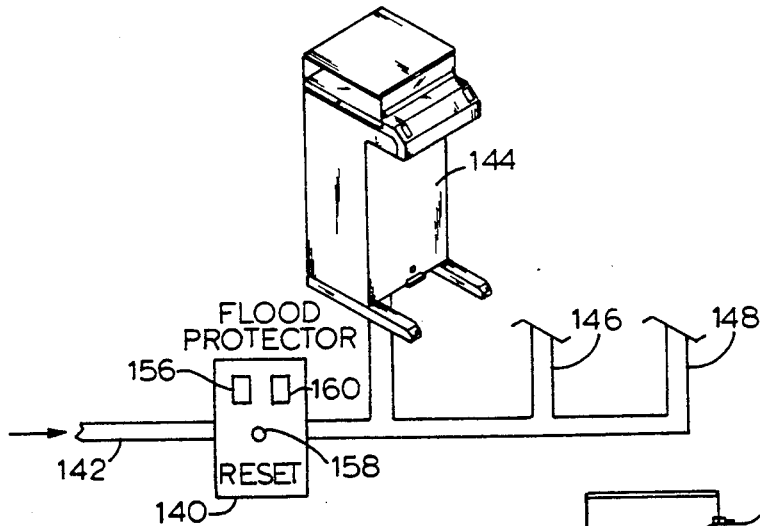
FIG. 2 is a schematic representation of the use of the fluid-flow control system as a flood protector on a branch plumbing line serving one or more beverage dispensing appliances.
Figure 3:
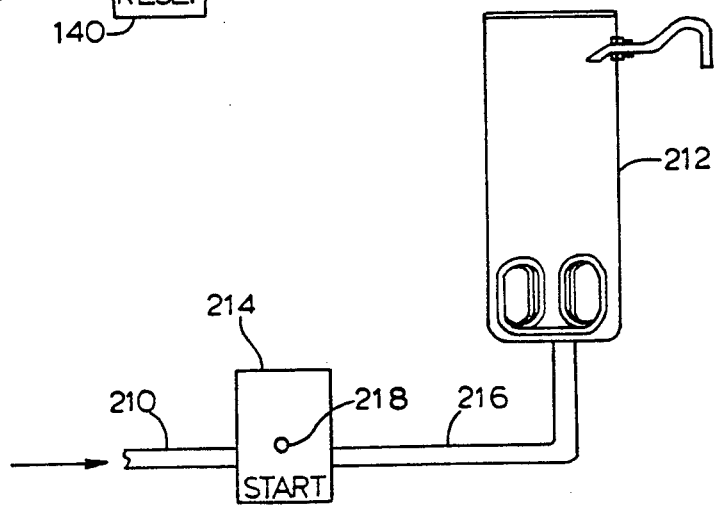
FIG. 3 is a schematic representation of the use of the fluid-flow control system as part of the internal automatic control system in a beverage dispenser, particularly showing its use in an automatic coffee brewer.

The system of FIG. 1 is designed to control the flow of fluid in conduit 10 by opening or closing valve 12 under selected conditions. Examples of how the flow controller of FIG. 1 can be used are shown in FIGS. 2 and 3. Both examples will be described in detail below, however, a brief explanation of the depicted examples will help clarify its function. In FIG. 2, the flow controller of FIG. 1 is employed as a flood protector on a branch plumbing line which supplies one or more fluid-consuming devices which consume the fluid in regular, finite consumption cycles. The appliance illustrated in FIG. 2 is a coffee brewer. The purpose of the flood protector is to close valve 12 whenever the quantity of fluid flowing in the branch plumbing line exceeds a pre-set maximum. In FIG. 3, the flow controller of FIG. 1 is employed as a cyclical fill controller which admits a predetermined quantity of fluid to a water tank whenever a fill cycle is initiated. Valve 12 is opened at the start of a fill cycle and recloses automatically when a predetermined flow quantity has been reached. The flow controller of the present invention accomplishes both the flood protection and fill cycle functions using the circuitry shown in FIG. 1.

Returning to FIG. 1, a flow meter 16 is mounted in series with valve 12 in fluid-flow conduit 10, which can be any type of pipe, hose or tube designed to carry a fluid such as water. Meter 16 serves as a flow monitoring device connected to conduit 10. The flow meter is preferably of the magnetic type, which employs a spinning impeller (not shown) mounted in the fluid stream. The impeller carries a magnet which moves with the impeller. An inductive sensor (not shown) outside the conduit senses the motion of the magnet and, after suitable signal processing and amplification, emits a signal such as a pulse train depicted schematically at 18 and shown more realistically as waveform A in FIG. 5.

Signal 18 is generally referred to as a pulse train. It is not a precise square wave, due to a rise-time lag in the flow meter output circuitry, but the signal contains detectable pulses that occur at a frequency directly proportional to the rate of fluid flow in conduit 10. In other words, as the flow rate in the conduit increases, the internal impeller turns faster and pulses are generated at a greater frequency. Pulse train 18, also referred to as first signal 18, thus contains information about the rate of fluid-flow in conduit 10, which information is directly translatable into information about the volume of fluid-flow in the conduit by simple calculation based on the capacity of conduit 10 and the metering characteristics of meter 16, as will be well understood by those skilled in the art. A suitable flow meter for use as meter 16 is model CH-2503 magnetic flow meter, manufactured by Digmesa of Switzerland.

In the system of the present invention, the signal containing pulse train 18 is supplied to signal analyzing circuitry which includes a counter 20 and a pulse sensing network 24. Both counter 20 and pulse sensing network 24 are operatively connected to flow meter 16, the output of meter 16 being connected to the input of network 24 by line 30 and to the input of counter 20 by branch line 22, which also includes a "divide by two" element 21. "Divide by two" element 21, which can be provided by one or more flip-flops, reduces the frequency of the pulses in pulse train 18 by half.

Figure 4:
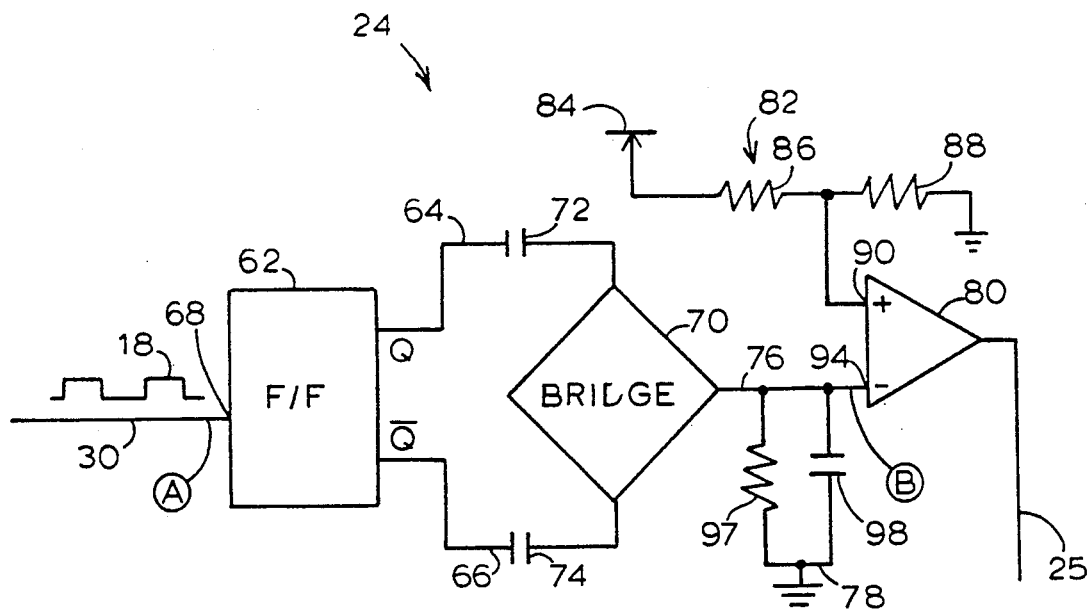
FIG. 4 is a schematic block diagram of the pulse sensing network employed in the system of FIG. 1, also referred to as the flow detector circuit.

Pulse sensing network 24 analyzes the pulse train to distinguish between periods of substantial fluid-flow and periods of no-flow in conduit 10. The circuitry in pulse sensing network 24 is shown in FIG. 4. It serves as a signal detector for detecting pulses from meter 16. As such, it also serves as a flow detector. Network 24 generates a reset or initialization signal on its output line 25 whenever pulse train 18 indicates a no-flow condition in conduit 10. The purpose of the reset or initialization signal is to reset counter 20 and also to reset or initialize a back-up timer, as will be described below. Network 24 accomplishes this function by the circuitry illustrated in FIG. 4. Pulse train 18, carried on line 30, is fed to the input of a flip/flop 62 which outputs signals on Q, Q-NOT output lines 64, 66, respectively. The Q and Q-NOT outputs switch from high-to-low and low-to-high each time a pulse is received at flip-flop input 68. The signals on output lines 64, 66 are opposites, one being high when the other is low and vice versa. Outputs 64, 66 are connected to opposite ends of a bridge rectifier circuit 70, through respective capacitors 72, 74. The purpose of flip/flop 62, bridge 70 and capacitors 72, 74 is to stabilize and rectify pulse train 18. The output of bridge circuit 70, carried on line 76, is then passed through an R-C network 78 to the input of a comparator 80. A reference voltage is supplied to a first input 90 of comparator 80 through a voltage divider 82. Assuming the system voltage of the preferred embodiment of the invention, supplied at point 84, is 12-volts, resistors 86, 88 are selected to develop a lower reference voltage at comparator input 90 of, for example, 5-volts. Comparator 80 is a conventional comparator amplifier circuit which serves as a signal output device and outputs a signal on line 25 that is high when the signal input at its second input 94 is below the reference voltage supplied to input 90. The comparator output on line 25 is low when the signal input at 94 is higher than the reference voltage at input 90.

Figure 5:
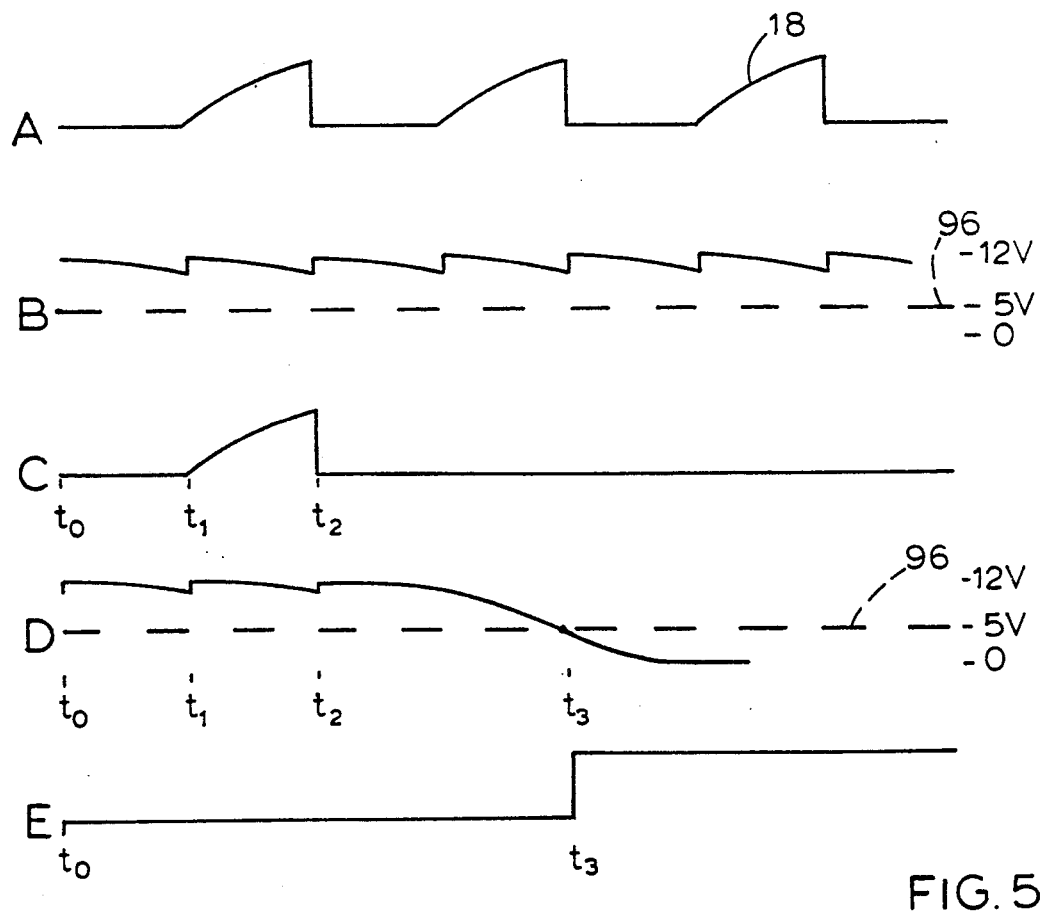
FIG. 5 is a time chart illustrating schematically the waveforms of various signals in the fluid flow control system of FIG. 1 and in the network of FIG. 4.

FIG. 5 illustrates various waveforms within pulse sensing network 24, waveforms A and B being found at the circled locations. Waveform A shows pulse train 18. The waveform is produced by the magnetic impeller in meter 16 turning relative to a magnetic pick-up and the resultant signal being suitably amplified to produce the waveform shown. Although waveform A is illustrated as having an unchanging frequency, it will be understood by those skilled in the art that the frequency of pulses in waveform A will vary with the fluid-flow rate through meter 16. A typical pulse frequency for waveform A will be, for example, 60 pulses-per-second.

Waveform A is supplied to input 68 of flip/flop 62. Waveform B is the rectified output of bridge circuit 70, after passing through R-C circuit 78. Waveform B is supplied to comparator input 94. As depicted in FIG. 5, waveform B resembles a sawtooth pattern. Essentially, the output of bridge circuit 70 is a rectified pulse train which would remain at or near the 12-volt operating voltage of the system except for the time decay introduced by R-C circuit 78. The result is the sawtooth pattern of waveform B, which remains at or near 12-volts, and well above the 5-volt reference voltage supplied to comparator input 90, whenever pulses are produced by meter 16. The 5-volt reference voltage is indicated in FIG. 5 by dashed line 96.

R-C circuit 78 serves as a chargeable element with a predetermined voltage decay rate which is charged to a selected voltage (12-volts) by each pulse supplied from flow meter 16 through flip/flop 62 and bridge 70. It is designed to produce a slow decay in the rectified signal output from bridge circuit 70. To illustrate the sequence when pulse train 18 stops, waveform C represents the end of a pulse train. Between times $t_0$ and $t_2$ is one cycle of waveform A. At time $t_2$, the pulse train stops, meaning that the flow of fluid through flow meter 16 has stopped. The output of bridge circuit 70 begins to decay at time $t_2$ through R-C circuit 78. Unless additional pulses are received at flip/flop input 68, the signal on line 76 will decay as shown in FIG. D between time $t_2$ and $t_3$. As soon as the signal at comparator input 94 drops below the reference voltage at comparator input 90, the output of comparator 80 goes high, as illustrated in waveform E. Continuing pulses received at flip/flop input 68 maintain the comparator output low, as shown between times $t_0$ and $t_3$. Once the pulse train stops, the output of comparator 80 goes high, after a short delay while the output signal from bridge 70 decays through R-C circuit 78.

A relatively long decay time is selected between cessation of pulses at time $t_2$ and the decay of the signal on line 76 below reference voltage 96, at $t_3$. That is to ensure that pulse train 18 has actually stopped. Under normal conditions, the time interval between $t_2$ and $t_3$ will be approximately one second. Thus, if pulse train 18 carries pulses at the very slow rate of one per second, the output of pulse sensing network 24 will remain low. In general, a flow rate through meter 16 which is so low as to yield a pulse frequency of one per second will be too low to move the impeller. As such, network 24 is actually designed to react only to substantial flow in conduit 10 and to allow the counting and timing devices of the system to measure flow quantities and flow times only during periods of substantial flow. Substantial flow means flow which is detectable by the system which, in the preferred embodiment, means flow rates as low as that produced by a slow drip from a faucet. Pulse sensing network 24 is designed to accommodate the lowest detectable flow rate output by meter 16. As an example of an R-C circuit suitable for use in pulse sensing network 24, resistor 97 has a value of 15-Kohms and capacitor 98 is 3.3-microfarads.

Pulse sensing network 24 reacts almost instantly to the beginning of a pulse train. The first pulse received at flip/flop input 68 immediately charges up the output of bridge circuit 70, turning off comparator output 25. At the conclusion of a pulse train, there is a slight delay between the receipt of the last pulse at flip/flop 68 and the termination of comparator output 25. The delay in turning on the output on line 25 acts as a conservative factor which ensures that the reset command supplied to counter 20 via line 25 is not prematurely given. It does not ultimately change the pulse count accumulated in counter 20 (as described below) because the counter is designed to receive and accumulate the actual pulse count which is not changed by one additional second of accumulation time. In summation, pulse sensing network 24 is able to distinguish periods of substantial fluid-flow, meaning periods when fluid is sufficient to move the impeller in meter 16 and produce a pulse rate exceeding one pulse per second, and to also distinguish periods of no-flow. Each period of no-flow causes comparator 80 to output a high signal a predetermined time interval (i.e., 1-second) after the cessation of pulses in pulse train 18.

Referring to FIG. 1, counter 20 is employed to accumulate a pulse count during each period of substantial fluid-flow through conduit 10, the pulse count being approximately proportional to the quantity of fluid passing through conduit 10 during each flow period. Counter 20 is operatively connected to valve 12, as described below, and is pre-programmed to produce a valve-closure signal on counter output line 132 to close the valve when a predetermined pulse count is reached. A conventional C-moss 4040 counter, with a 12-bit capacity, is suitable for use as counter 20.

The output of comparator 80 is carried on line 25 to the reset input 126 of counter 20. Whenever the pulse sensing network senses substantial flow in conduit 10, which means flow sufficient to move the internal impeller in meter 16, the reset signal on line 25 is turned off. When the flow in conduit 10 stops, the reset signal on line 25 is turned on and the signal serves as an initialization signal for the counter. Thus, pulse sensing network 24 initializes counter 20 during each period of no-flow in conduit 10, ensuring that the counter is ready to begin accumulating a pulse count at the start of each period of substantial fluid flow. Counter 20 thereby accumulates a pulse count only during periods of fluid-flow. If the flow is interrupted, counter 20 is reset.

Counter 20 is selectively programmable to output a valve-closure signal on output line 132 whenever the accumulated pulse count reaches a predetermined maximum count. The maximum count is set to correspond to the maximum quantity of fluid which is to be allowed to pass through flow meter 16 during a single uninterrupted flow interval. In the flood protector example of FIG. 2, for example, box 140 represents the flow controller illustrated in FIG. 1. The flow controller is installed in a branch plumbing line 142 used to supply one or more beverage dispensers such as coffee brewer 144 or a similar water-consuming device which draws water from line 142 in periodic cycles of limited duration and quantity. Valve 12 and flow meter 16 are installed in series in plumbing line 142 within box 140, and the remainder of the circuitry of FIG. 1 is also housed in the box. Protector box 140 serves to permit a predetermined limited quantity of water to pass through conduit 40 to the downstream water-consuming appliances.

To set counter 20 to provide the correct predetermined maximum quantity of flow through protector 40, it is essential that the water requirements of the one or more water consuming appliances on line 142 be met during each uninterrupted flow interval. For example, assuming only brewer 144 is supplied by branch line 142, and further assuming that the maximum water requirement for the brewer during a fill cycle is one gallon, the flow in branch line 142 will be in periodic increments of one gallon each. If more than one gallon flows uninterrupted through branch line 142, it is likely that a leak or other malfunction has occurred. In order to protect against flood damage, without interfering with the normal operation of brewer 144, flood protector 140 should be set to permit at least one gallon to flow uninterrupted through the device. It should not allow a significantly greater quantity to flow uninterrupted. A suggested setting for the flow quantity permitted to pass through flood protector 140 before it shuts off the flow would be approximately three gallons. Naturally, if additional appliances are connected to branch line 142, such as at locations 146 and 148, the permitted flow before shut-off needs to be set higher. Regardless of the number of dispensers or other water-consuming appliances attached to branch line 142, the permitted flow through flood protector 140 should be set to exceed the estimated maximum demand quantity of all fluid-consuming devices reasonably expected to simultaneously or sequentially demand water during one uninterrupted cycle.

To set the maximum pulse count in counter 20, the maximum uninterrupted flow quantity to be allowed to pass through meter 16 in one flow cycle is first determined in accordance with the principles just described. For example, if 4000 pulses are generated as three gallons of fluid pass through meter 16, and three gallons is the desired maximum flow quantity at which shut-off is desired, counter 20 should be set to a maximum count of 2000 (assuming "divide by two" element 21 is installed on counter input line 22). Counter 20, if it is a conventional 12-bit 4040 programmable counter, will include a series of binary switches that are setable to any number between 0 and 4096. For example, to set the counter to a maximum count of 2000, the binary switches are set as follows: 000010111110. When programmed to that number, counter 20 will accumulate the pulses in pulse train 18, with "divide by two" element 21 transmitting every other pulse to counter input 23, until a maximum count of 2000 pulses is accumulated in the counter. When the pulse count reaches 2000, counter 20 outputs a valve-closure signal on output line 132.

Counter 20 is operatively connected to valve 12, and signals the closing of the valve when the predetermined maximum pulse count has been reached, by emitting a valve-closure signal on line 132. The valve-closure signal from counter 20 is transferred to a suitable latch 150 through an OR-gate 139. Latch 150 maintains the signal which closes the valve until reset. It serves as a power supply control device for energizing and de-energizing valve solenoid 14. Latch 150 outputs a solenoid-control signal on line 151 which activates a solenoid switch 152 by means of solenoid 153. Switch 152, in turn, energizes valve solenoid 14 of valve 12 via line 154, supplying energizing power to valve solenoid 14, preferably at 24-volts AC. The output of counter 20 serves as a valve-closure signal, carried on line 132, which effectively operates to terminate the "valve open" signal carried on line 154, de-energizing solenoid 14 and closing valve 12.

Describing a typical flood control sequence, with reference to FIGS. 1 and 2, if there is no flow in conduit 142 (conduit 10 in FIG. 1) and if valve 12 is held open by power supplied from solenoid switch 152 through line 154, flow meter 16 will emit no pulses. Consequently, pulse sensing network 24 detects no pulses and outputs a continuous reset signal on line 25 which initializes counter 20. When a fill cycle in brewer 144 is initiated, water begins to flow through valve 12 and meter 16 of flood protector 40. That produces a pulse train 18 which is detected by pulse sensing network 24 and is carried to counter 20 via line 22 and "divide by two" element 21. Once the pulse sensing network detects pulses on line 30, it de-energizes the reset signal on line 25, enabling the counter 20 to begin accumulating a pulse count. If brewer 144 operates normally, meaning the total uninterrupted flow through flood protector 140 does not exceed the maximum permitted flow determined by the maximum count setting in counter 20, the accumulated pulse count in counter 20 does not reach the maximum pulse count before the brewer shuts off the flow. Once brewer 144 shuts off the flow through conduit 142, the pulse train from flow meter 16 stops. Pulse sensing network detects the cessation of pulses and turns on the reset signal on line 25 which clears counter 20 and initializes it to begin the next pulse count whenever the reset signal is switched off.

If brewer 144 malfunctions or a line break develops in line 142, and the flow of water exceeds the maximum permitted flow through flood protector 140, the output from counter 20, on line 132, changes states. The signal output from counter 20 in line 132 is a valve-closure signal which passes through OR-gate 139 to latch 150. Latch 150 then de-energizes line 151, which opens solenoid switch 152 and interrupts the power supplied on line 154 to valve solenoid 14, closing valve 12.

An optional feature which enhances the utility of the flow controller is the provision of an indicator light 156 which is illuminated whenever a valve-closure signal has closed valve 12. Indicator light 156 is shown in FIG. 1 as an LED. Whenever latch 150 has received a valve-closure signal at input 159, the latch causes LED 156 to illuminate which alerts a user that the flood protector valve has closed. A suitable reset switch 158 is provided to reopen valve 12 after a valve-closure signal has caused latch 150 to close valve 12. Switch 158 is operatively connected to latch 150, and through latch 150 to valve 12, and is designed to reopen the valve by turning on the latch output on line 151 and re-energizing solenoid 153 to close switch 152. That, in turn, re-energizes valve solenoid 14 and opens valve 12. Once reset switch 158 is depressed, latch 150 will continue to maintain valve 12 open until another valve-closure signal is supplied to latch input 159, or until the power supply to the entire unit is cut off.

A second light 160 is preferably also provided on flood protector 140 to indicate that valve 12 is open and the flood protector has not been engaged. Light 160 can conveniently be illuminated by latch output line 151, as shown in FIG. 1. Light 160 is preferably a suitable LED. Lights 156 and 160 facilitate use of flood protector 140. When light 156 is illuminated, indicates valve 12 is closed and must be reopened by depressing reset switch 158 before fluid can again flow in the conduit. Light 160 is, in effect, a "running" light which lets the user know that the flood protector is on and that no flood condition has been detected.

The above-described circuitry in FIG. 1 uses counter 20 as a primary cut-off circuit element to shut valve 12 in the event of a flood condition on branch line 42. The preferred embodiment fluid-flow control system of the present invention also includes a secondary or back-up shut-off circuit element which will trigger closure of valve 12 if the primary shut-off circuitry fails. The back-up protective element includes a timer 200 operatively connected to pulse sensing network 24 and outputting a signal on line 206 which operates to close valve 12 (see FIG. 1).

Timer 200 is preferably a C-Moss 4541 timer/counter. It is operatively connected to pulse sensing network 24 by network output line 25, which supplies a reset signal to timer 200 in the same manner as the reset signal is supplied to counter 20. Timer 200 is set to trigger a valve-closure output signal on line 206 whenever a predetermined time interval between reset commands is exceeded. Timer 200 times each continuous, uninterrupted pulse train from flow meter 16. The timer is turned on whenever pulse sensing network 24 detects pulses from flow meter 16. At all other times, pulse sensing network 24 sends a reset command to timer in reset input 202 which effectively turns off the timer. If pulse sensing network 24 detects a continuous, uninterrupted string of pulses for a period longer than the maximum time interval of timer 100, the timer will output a valve-closure signal at timer output 204. The valve-closure signal is sent to latch 150 through OR-gate 139, which closes valve 12 in the same manner as counter 20 described above.

Because timer 200 is intended as a back-up or secondary cut-off circuit element, with counter 20 being the primary cut-off circuit element to shut valve 12, the maximum time interval programmed into the timer should be sufficiently long to exceed the time it takes, under normal conditions, for counter 20 to reach its maximum predetermined pulse count. For example, if a normal flow quantity for the dispensing appliances downstream from flow meter 16 is one gallon, and the water pressure and line conditions allow that quantity to pass through the flow meter in one minute, counter 20 will be set to shut off valve 12 when an uninterrupted flow proceeds for perhaps three gallons. In order to provide back-up or secondary shut-off protection, timer 200 should be set to a time interval exceeding the anticipated time interval for three gallons to pass through meter 16. Assuming the time interval for three gallons to pass through the meter is approximately three minutes, timer 100 is preferably set to a maximum time interval of five or six minutes. In that way, if for some reason counter 20 fails to stop the flow and pulses continue to emerge from meter 16 uninterrupted for a period of five or six minutes, timer 200 will output a valve-closure signal on line 206 and valve 12 will be closed. To reopen valve 12 after it has been shut by timer 200 reset button 58 is depressed.

The circuitry shown and described with reference to FIGS. 1 and 4 can also be used as a beverage dispenser control device, as shown in FIG. 3. In this mode of operation, the circuitry of FIG. 1 is employed internally within a brewer or other dispensing device to perform cyclic metering of fluid into the device. In the example of FIG. 3, the flow controller is housed in box 214 and controls the fill cycle of the brewer. A fluid line 210 supplies water or other fluid to a tank 212 within the brewer and the control system of the present invention meters the water to the tank in an improved manner by measuring the quantity of fluid passing through the system.

Assuming conduit 210 is connected to external plumbing and controller 214 includes valve 12 and flow meter 16 in line 210, the controller can admit a predetermined quantity of water into tank 212 via connecting line 216. If, for example, tank 212 holds one gallon of water, controller 214 will be programmed so that a maximum of one gallon of water flows through meter 16 before a valve-closure signal is produced on line 132 by counter 20.

In this configuration of the control system, valve 12 is normally closed when the system is powered up and is only opened when reset button 158 is depressed. By depressing reset button 158, which is termed the start button 218 in FIG. 3, valve 12 is opened and pulses begin to emerge from meter 16. As soon as the pulses begin, pulse sensing network 24 turns off the reset signal on line 25 and allows counter 20 to begin counting. When the maximum pulse count is reached, indicating that one gallon has passed through meter 16, counter 20 sends a valve-closure signal to latch 150, reclosing valve 12. The next fill cycle is begun by again depressing reset button 158 and the process is repeated.

In the dispenser control mode, timer 200 again acts as a back-up or secondary shut-off circuit operatively connected to the flow detector circuit (which includes meter 16 and pulse sensing network 24) and outputs a valve-closure signal via line 206. The timer will be set to an interval longer than the maximum anticipated time interval for counter 20 to reach its maximum pulse count. If the anticipated time interval for filling tank 212 is one minute, timer 200 should be set to a longer interval, for example, three minutes.

The only difference between the flood protector mode of FIG. 2 and dispenser control mode of FIG. 3 is that, in the flood protector mode, valve 12 opens when the circuit is powered up and in the dispenser control mode valve 12 remains closed until reset button 158 is depressed. In other words, the power supply for valve solenoid 14, controlled by latch 150, is either initially on in the flood protector mode or initially off in the dispenser control mode. A simple jumper arrangement within latch 150, which can be set by the manufacturer of the flood protector or dispenser control unit, will suffice to determine which mode the circuit operates in when the unit is powered up. The jumper (not shown) will set the initial conditions for valve 12. All other circuitry is the same for both the flood protector and dispenser control. The same jumper circuit (not shown), used to establish initial conditions, can also enable or disable the circuit controlling indicator LED 56.

The present invention provides a simple, straightforward and inexpensive fluid-flow control circuit which can be conveniently adapted for either flood protection or a quality-based measured opening of a solenoid-controlled valve. The system provides for automatic measurement of the quantity of fluid passing through the conduit and shuts the valve only when a predetermined quantity is exceeded. A secondary or back-up system protects against failure of the primary shut-off circuit, further enhancing the reliability of the system in protecting against inadvertent costly floods produced by broken water lines.

In particular applications, it may be necessary to install additional "divide by two" elements between the counter and flow meter in order to properly scale the pulse train frequency to the capacity of the counter. Other alternative forms of the flow controller are also possible within the scope of the present invention. For example, the indicator lights on the flood protector version of the invention are optional. The use of a continuous-duty valve which remains open only when energized, is also optional. The valve could be of the reverse configuration, meaning that it is normally closed. The suggested valve configuration is preferable, however, because it remains closed during power outages which might well produce malfunctions in dispensing appliances or the like which could cause floods.

While the present invention has been shown and described with reference to the foregoing preferred embodiment, it will be apparent to those skilled in the art that other changes in form and detail may be made without departing from the scope and spirit of the invention as defined in the appended claims.

What is claimed is:

1. A fluid-flow control system for shutting off the flow in a conduit under selected conditions comprising:
   a flow monitor operatively connected to such a conduit for producing a first signal containing information about the volume of fluid flow in the conduit,
   a signal-controlled valve operatively connected to the conduit,
   a signal detector operatively connected to said flow monitor for analyzing said first signal and for distinguishing periods of substantial fluid flow from periods of no-flow through the flow monitor, and
   a flow quantity measuring device operatively connected to said flow monitor, said signal detector and said valve for measuring the approximate quantity of fluid passing through the flow monitor during each period of substantial fluid flow and for outputting a valve closure signal to said valve to close the valve when a predetermined flow quantity has passed through said flow monitor during a period of uninterrupted fluid flow.

2. A fluid-flow control system as in claim 1 in which said signal detector senses the state of said first signal and distinguishes the start of a period of fluid flow in the conduit when said first signal is in one state and the start of a period of no-flow when said first signal is in a different state for a predetermined time interval.

3. A fluid-flow control system as in claim 2 in which said first signal produced by said flow monitor is a pulse train having a pulse frequency proportional to the rate of fluid flow in the conduit, and said flow quantity measuring device includes a counter operatively connected to said flow monitor and to said signal detector for receiving said pulse train and for counting pulses during each period of substantial fluid flow to measure the quantity of fluid flow.

4. A fluid-flow control system as in claim 3 in which said signal detector outputs a reset signal to said counter for initializing said counter during each period of no-flow, whereby said counter is ready to begin accumulating a pulse count to measure the quantity of fluid flow through the conduit during the next period of substantial fluid flow.

5. A fluid-flow control system as in claim 4 including a timer operatively connected to the valve and to said signal detector for receiving said reset signal, said timer timing the intervals when said reset signal is off, whereby said timer times each period of substantial fluid flow in the conduit, said timer outputting a valve-closure signal to close the valve when a predetermined interval of uninterrupted fluid flow is exceeded.

6. A fluid-flow control system for shutting off the flow in a conduit under selected conditions by means of a signal-controlled valve, the system, in operative condition, comprising:
   a flow monitor operatively connected to such a conduit for producing a first signal containing information about the volume of fluid flow in the conduit,
   signal analyzing circuitry operatively connected to said flow monitor and the valve for analyzing said first signal to distinguish periods of substantial fluid flow from periods of no-flow in the conduit, to measure the approximate quantity of fluid passing through the conduit during each period of substantial fluid flow, and to close the valve when a predetermined quantity is exceeded, and
   a timer operatively connected to said signal analyzing circuitry and the valve for timing each period of substantial fluid flow and for closing the valve when a predetermined interval of uninterrupted fluid flow is exceeded.

7. A fluid-flow control system for shutting off the flow in a conduit under selected conditions by means of a signal-controlled valve, the system, in operative condition, comprising:
   a flow monitor operatively connected to such a conduit for producing a pulse train containing information about the fluid flow in the conduit,
   a counter operatively connected to the flow monitor and the valve for counting the pulses in said pulse train and for producing a valve-closure signal to close the valve when a predetermined pulse count is reached, and
   a signal detector operatively connected to said flow monitor for monitoring said pulse train to distinguish periods of substantial fluid flow from periods of no-flow, including a pulse sensing circuit for detecting pulses from said flow monitor and for initializing said counter when the pulse train indicates that the flow of fluid has stopped, whereby the counter accumulates the pulse count only during periods of uninterrupted fluid flow through the conduit and is reset during each period of no-flow in the conduit.

8. A fluid-flow control system as in claim 7 in which said flow monitor produces pulses in said pulse train at a frequency proportional to the rate of fluid flow in the conduit, whereby the accumulated count in said counter is proportional to the quantity of fluid that has passed said flow monitor since the last counter initialization.

9. A fluid-flow control system as in claim 8 in which said flow monitor includes an impeller carrying a magnet mounted in the fluid stream within the conduit and an inductive sensor outside the conduit.

10. A fluid-flow control system as in claim 7 including a reset switch operatively connected to the valve for opening the valve, whereby fluid flow in the conduit is initiated.

11. A fluid-flow control system as in claim 10 in which the system serves as a flood protector for terminating fluid flow when a predetermined flow quantity has passed through the flow monitor, wherein said flow monitor produces pulses in said pulse train at a frequency proportional to the rate of fluid flow and said pulse count in said counter is proportional to the quantity of fluid which has passed the flow monitor since the last initialization, said reset switch serving to reopen the valve after it has been closed by a valve-closure signal.

12. A fluid-flow control system as in claim 10 in which the system serves as a fluid-dispensing control to dispensing a predetermined quantity of fluid through the conduit during one dispensing cycle, wherein said flow monitor produces pulses in said pulse train at a frequency proportional to the rate of fluid flow and said pulse count in said counter is proportional to the quantity of fluid which has passed the flow monitor since the last initialization, said reset switch serving to open the valve and initiate a dispensing cycle which is terminated by said counter when said predetermined pulse count is reached.

13. A fluid-flow control system for shutting off the flow in a conduit under selected conditions by means of a signal-controlled valve, the system, in operative condition, comprising:
a flow monitor operatively connected to such a conduit for producing a flow quantity signal containing information about the fluid flow in the conduit,
a flow detector circuit operatively connected to said flow monitor for determining from said flow quantity signal when fluid flow in the conduit starts and stops, and for outputting a reset signal which is in a first state when said flow quantity signal indicates fluid is flowing in the conduit and in a second state when said flow quantity signal indicates that the flow of fluid has stopped,
a primary shut-off circuit operatively connected to said flow monitor, said flow detector circuit and the valve for analyzing said flow quantity signal during intervals when said reset signal is in said first state and for closing the valve when a predetermined flow quantity value is exceeded, and
a secondary shut-off circuit operatively connected to said flow detector circuit and the valve for measuring each time interval when said reset signal is in said first state and for closing the valve when said time interval exceeds a predetermined time interval.

14. A fluid-flow control system as in claim 13 in which said flow monitor produces a train of pulses at a frequency proportional to the rate of fluid flow in the conduit, said primary shut-off circuit includes a pulse counter for counting the pulses produced by said flow monitor and for producing a valve-closure signal to close the valve when a predetermined pulse count is reached, and the system further includes a reset switch operatively connected to the valve for opening the valve.

15. A fluid-flow control system as in claim 14 in which the system serves as a flood protector for terminating fluid flow when a predetermined flow quantity has passed through the flow monitor, wherein said reset switch serves to reopen the valve after it has been closed by a one of said primary and secondary shut-off circuits.

16. A fluid-flow control system as in claim 14 in which the system serves as a fluid-dispensing control to dispense a predetermined quantity of fluid through the conduit during one dispensing cycle, said reset switch serving to open the valve and initiate a dispensing cycle which is terminated by said counter when said predetermined pulse count is reached, said secondary shut-off including a timer for measuring said predetermined time interval, the predetermined time interval being set to exceed the time required for one said dispensing cycle, whereby said secondary shut-off serves as a back-up system for closing the valve in case the primary shut-off circuit fails to do so.

17. A fluid-flow control system for shutting off the flow in a conduit under selected conditions by means of a signal-controlled valve, the system, in operative condition, comprising:
a flow monitor operatively connected to such a conduit for producing a pulse train containing information about the fluid flow in the conduit,
a counter operatively connected to the flow monitor and the valve for counting the pulses in said pulse train and for producing a valve-closure signal to close the valve when a predetermined pulse count is reached,
a pulse sensing circuit connected to said flow monitor and said counter for detecting the pulses from said flow monitor and for initializing said counter when an absence of pulses indicates that the flow of fluid has stopped, whereby the counter accumulates the pulse count only during periods of uninterrupted fluid flow through the conduit, and
a timer operatively connected to said pulse sensing circuit and the valve for producing a signal to close the valve a predetermined time interval after said pulse sensing circuit detects an absence of pulses, whereby the valve is closed when the fluid flow is uninterrupted for longer than said predetermined time interval.

18. A fluid-flow control system for shutting off the flow in a conduit under selected conditions by means of a signal-controlled valve, the system, in operative condition, comprising:
a flow monitor operatively connected to such a conduit for producing a pulse train containing information about the fluid flow in the conduit,
a counter operatively connected to the flow monitor and the valve for counting the pulses in said pulse train and for producing a valve-closure signal to close the valve when a predetermined pulse count is reached,
a pulse sensing circuit connected to said flow monitor and said counter, said pulse sensing circuit including a chargeable element with a predetermined voltage decay rate which is charged to a selected voltage by each pulse from said flow monitor, a comparator for comparing the voltage on said chargeable element against a predetermined reference voltage, and
a signal output device which produces an initialization signal for initializing said counter when the voltage on said chargeable element falls below said reference voltage indicating an absence of pulses and a lack of fluid flow in the conduit, whereby the counter accumulates the pulse count only during periods of uninterrupted fluid flow through the conduit.

* * * * *